United States Patent [19]

Harris

[11] Patent Number: 5,250,316

[45] Date of Patent: Oct. 5, 1993

[54] NON-BAKED CHEESECAKE

[76] Inventor: Booker T. Harris, 480 Parkside Dr., Carol Stream, Ill. 60188

[21] Appl. No.: 858,887

[22] Filed: Mar. 27, 1992

[51] Int. Cl.$^5$ .................................................. A23L 1/05
[52] U.S. Cl. ................... 426/573; 426/576; 426/578; 426/582
[58] Field of Search ............... 426/582, 613, 573, 576, 426/578

[56] References Cited

U.S. PATENT DOCUMENTS

| | | | |
|---|---|---|---|
| 2,868,653 | 1/1959 | Diamond et al. | |
| 3,353,965 | 11/1967 | Patterson | 99/139 |
| 3,479,190 | 11/1969 | Ganz | 99/139 |
| 4,163,806 | 8/1979 | Callen et al. | 426/582 |
| 4,251,560 | 2/1981 | Dell et al. | 426/565 |
| 4,254,156 | 3/1981 | DeSocio et al. | 426/565 |
| 4,312,891 | 1/1982 | Eisfeldt | 426/573 |
| 4,505,943 | 3/1985 | Dell et al. | 426/565 |
| 4,594,255 | 6/1986 | Wilson et al. | 426/578 |
| 4,732,772 | 3/1988 | Nolte | 426/573 |
| 4,795,650 | 1/1989 | Groobert | 426/306 |

*Primary Examiner*—Jeanette Hunter
*Attorney, Agent, or Firm*—Fitch, Even, Tabin & Flannery

[57] ABSTRACT

In accordance with the method of the present invention for making an unbaked cheesecake, a mixture of heated water, gelatin, a gum, starch and ricotta cheese is formed. The mixture is subjected to high shear agitation for a period of time sufficient to gelatinize the starch and provide a smooth homogeneous dispersion. The homogeneous dispersion is then combined with a non-dairy whipped topping and the combination is mixed to provide a cheesecake blend. Upon refrigeration, a cheesecake is provided in final form without the use of a baking step.

6 Claims, No Drawings

NON-BAKED CHEESECAKE

FIELD OF THE INVENTION

The present invention relates to a food mix which can be used to provide a cheesecake without baking. More particularly, the present invention is directed to a method for the preparation of a non-baked cheesecake which has relatively low levels of fat and sugar.

BACKGROUND OF THE INVENTION

Recent trends in the food industry have concentrated on providing food products which have reduced levels of fat, reduced calories and reduced cholesterol. A substantial amount of research effort has been expended, particularly in the area of producing reduced fat or low fat and reduced calorie dessert products such as ice cream and baked goods. It would be desirable to produce a reduced fat and reduced calorie cheesecake particularly if such cheesecake can be produced without utilizing eggs, which contain substantial cholesterol, and without baking. Cheesecakes are typically based on the use of eggs and cream cheese to produce body and texture. Usually, cheesecake formulations include cream cheese, butter or vegetable shortening, flour, sugar and eggs. It is also known to produce cheesecakes from an egg yolk custard into which is stirred dissolved gelatin. The gelatin-custard mixture is combined with cream cheese, beaten egg whites sugar and whipping cream to provide a cream cheese cake mix which can be prepared without baking.

Callen, et al. U.S. Pat. No. 4,163,806 is directed to a non-baked cheesecake which is prepared from a mixture consisting essentially of cream cheese, non-dairy whipped topping and powdered sugar. After the mixture of cream cheese, non-dairy whipped topping and powdered sugar is prepared, the mixture is refrigerated for a period of time until firm to produce a cheesecake in final form without baking. The non-baked cheesecake of the Callen, et al. patent, however, has high fat levels and high calories due to the fat content of the cream cheese and the added powdered sugar.

In accordance with the present invention, the cheese component of a cheesecake formulation is ricotta cheese which has substantially less fat than cream cheese. It is, of course, known to make cheesecakes from ricotta cheese utilizing an egg, sugar and ricotta cheese mixture which is baked to produce the cheesecake.

Accordingly, it is a principal object of the present invention to provide a formulation suitable for producing a cheesecake without baking.

It is another object of the present invention to provide a ricotta cheese based cheesecake formulation which produces a cheesecake texture and mouthfeel similar to that produced by baked cheesecakes utilizing cream cheese and eggs in the formulation.

These and other objects of the present invention will become more apparent from the following detailed description and the accompanying claims.

SUMMARY OF THE INVENTION

In accordance with the method of the present invention for making an unbaked cheesecake, a mixture of heated water, gelatin, a gum, starch and ricotta cheese is formed. The mixture is subjected to high shear agitation for a period of time sufficient to gelatinize the starch and provide a smooth homogeneous dispersion. The homogeneous dispersion is then combined with a non-dairy whipped topping and the combination is mixed to provide a cheesecake blend. Upon refrigeration, a cheesecake is provided in final form without the use of a baking step.

DETAILED DESCRIPTION OF THE INVENTION

The cheesecake formulation of the present invention is based on the use of ricotta cheese as the cheese component. Ricotta cheese is an unripened variety of Italian cheese and in the past was made from whey serum protein, particularly the whey of mozzarella cheese or cheddar cheese. Ricotta cheese is currently primarily manufactured from whole or part skim milk and may be manufactured from skim milk. Ricotta cheese is sometimes referred to as recooked cheese in that the whey produced during the cheese making process may be subjected to treatment to coagulate the serum protein which is added back to the cheese.

In the manufacture of ricotta cheese from whole milk or part skim milk, a lactic starter is added to milk in a quantity so that the titratable acidity is about 0.3% and the pH is 5.9-6.0. The milk is then coagulated by use of heat through direct steam injection to the acidified milk. Heating is usually continued until a temperature of about 176° F. is attained. The coagulated milk is allowed to remain quiescent until the curd particles become firm and coalesce on the surface. After the curd has been dipped or skimmed from the surface of the whey, a small amount of whole milk is added to the remaining hot whey along with some citric acid. The whey is again heated until the serum protein coagulates into curds. The coagulated curds are removed from the surface and combined with the previously harvested curd.

The fat content of whole milk ricotta cheese made from 3% to 3½% fat milk is about 12.7%. The fat content of part skim ricotta made from 2% fat milk is about 8.4%. In those areas where ricotta cheese is made extensively from whole milk or part skim milk, the heat precipitated cheese made from whey is called Ricotone. §Ricotta cheese is combined with water, sugar, a gum, gelatin and starch to provide a cheese base. The cheese base is blended with a whipped topping to provide the non-baked cheese cake formulation of the invention.

The ricotta cheese is used in the cheeseake formulation of the present invention at a level of from about 55% to about 65%. Water is present in the formulation at a level of from about 7% to about 13%. Gelatin is present at a level of from about 0.3% to about 1.0%. Sugar is present at a level of from about 2% to about 7% or an equivalent amount if an artificial sweetener is used. The gum is present at a level of from about 0.5% to about 1.0%. Starch is present at a level of from about 0.7% to about 1.5%. A non-dairy whipped topping is used in the formulation at a level of from about 12% to about 20%. All percentages and measurements used herein are by weight unless otherwise indicated.

In preparing the non-baked cheesecake of the present invention, the water is heated to a temperature of at least about 190° F. and preferably in the range of from 190° F. to boiling. The water is then placed into a high shear mixer, such as a household blender. Gelatin and the gum are added to the water and the blender is agitated for a period of about 30 seconds. The starch is added to the blender and mixed for about 3 to 5 minutes to disperse and gelatinize the starch and form a homogeneous dispersion. The ricotta cheese, which has been warmed to a temperature of between 100° F. and 110° F. is added to the blender and the mixture is agitated for a period of from about 10 to about 20 minutes until a uniform cheese base has been formed. The cheese base is transferred to a low shear mixer, such as a planetary household mixer. The non-dairy dessert topping is added to the cheese base and the mixture is agitated until uniform under low speed conditions to form a cheesecake blend. The cheesecake blend is then poured into a suitable package and refrigerated to provide a cheesecake in final form without baking.

It is important that the temperature be controlled during the various steps of preparing the cheesecake formulation of the invention. The temperature of the mixture of water, gelatin, gum and starch should be maintained within the range of from about 190° F. to about 210° F. during the agitation period. After the ricotta cheese is added to the blender, the temperature should be maintained within the range of from about 120° F. to about 130° F. to provide the cheese base. The combination of the cheese base and the non-dairy whipped topping should be maintained within the range of from about 75° F. and about 85° F. during the low speed mixing. The gradual reduction of temperature during the various steps to within the indicated ranges is important to attain a velvety cheesecake texture from the disparate components utilized.

If desired, flavoring may be added to the mixture. The flavoring may be any desired flavor, such as vanilla, lemon juice, pineapple, strawberry, chocolate, coffee, banana or peanut butter according to the individual taste. In an important embodiment of the present invention, commercial flavored gelatins are used to provide the gelatin component of the cheesecake formulations. Such commercial flavored gelatins, such as Jello ™ made by Kraft General Foods, Inc. contain the gelatin as well as a desired flavor and sugar. Additionally, various toppings, such as pineapple, strawberry, raspberry or lemon custard may be used to cover the top of the cheesecake.

The non-dairy whipped topping component is an aerated fatty emulsion which is commercially available in aerated form having an overrun of about 100%. An example of a suitable non-dairy whipped topping is set forth in Patterson U.S. Pat. No. 3,353,965. Such commercial non-dairy whipped topping formulations typically contain water, hydrogenated vegetable fat, sugar, dextrose, sodium calcinate, polysorbate 60, sorbitan monostearate, carrageenan, guar gum and artificial or natural flavors.

The gum may be any of the commonly used food grade gums. Such gums include carrageenan, guar gum, locust bean gum, xanthan gum, carob bean gum, pectin algins, carboxymethyl cellulose and microcrystalline cellulose. The preferred gum is carrageenan.

The starch may be any natural or modified starch, such as corn starch, potato starch, rice starch and tapioca starch. The starch may be natural or pregelatinized. The use of pregelatinized starch is sometimes preferred to insure that gelatinization of the starch takes place during the mixing. A preferred starch is corn starch.

The following example further illustrates various features of the present invention, but is intended to in no way limit the scope of the invention as set forth in the appended claims.

EXAMPLE

A cheesecake was prepared without baking according to the following procedure. Twelve fluid ounces of water were brought to a boil and placed into a household blender. Two packages of cherry flavored Jello ™ gelatin mix containing a total of 0.6 ounce of gelatin by weight and 0.5 ounce of carrageenan were added to the blender and blended for 30 seconds. One ounce of corn starch was added to the blender and blending was continued for 5 minutes until the starch was gelatinized and a smooth paste had formed. 32 ounces of fresh ricotta cheese which had been warmed to a temperature of 105° F. was then added to the blender and blending was continued for 15 minutes until a homogeneous dispersion of the components had been attained. The homogeneous dispersion was removed from the blender and placed into a KitchenAid ™ household mixer. 16 ounces of a refrigerated non-dairy whipped topping was added to the homogeneous dispersion in the mixer and mixing at low speed was continued until a uniform mixture was attained in about 3 minutes.

The entire mixture was then poured into several 8 inch pie plates which contained a prebaked crust of a mixture of crushed graham crackers and margarine. The pie plates were then placed into a refrigerator for 1 hour. Upon removal from the refrigerator, the texture of the cheesecake was firm enough to permit slicing and provide a non-baked cheesecake with reduced fat, calories and cholesterol compared to conventional baked cheesecakes.

I claim:

1. A method for making an unbaked cheesecake which comprises:
   (a) forming a mixture of heated water, sugar, gelatin, a gum and starch;
   (b) subjecting said mixture to high shear mixing while said mixture is at a temperature of from about 190° F. to about 210° F. for a period of time sufficient to gelatinize said starch and provide a homogeneous dispersion;
   (c) combining said homogeneous dispersion with heated ricotta cheese and continuing said high shear mixing at a temperature of from about 120° F. to about 130° F. to provide a cheese base;
   (d) combining said cheese base with a non-diary whipped topping and subjecting said combination to low shear mixing at a temperature of from about 75° F. to about 85° F. to provide a chesecake blend; and
   (e) refrigerating said cheesecake blend for a period of time until firm to produce a cheesecake in final form without baking.

2. A method in accordance with claim 1 wherein said gum is carrageenan.

3. A method in accordance with claim 1 wherein said gum is present at a level of from about 0.5% to about 1.0%.

4. A method in accordance with claim 1 wherein said starch is corn starch.

5. A method in accordance with claim 1 wherein said starch is present at a level of from about 0.7% to about 1.5%.

6. A method in accordance with claim 1 wherein said ricotta cheese is present at a level of from about 55% to about 65%, water is present at a level of from about 7% to about 13%, sugar is present at a level of from about 2% to about 7%, gelatin is present at a level of from about 0.3% to about 1.0%, gum is present at a level of from about 0.5% to about 1.0%, starch is present at a level of from about 0.7% to about 1.5% and the non-dairy whipped topping is present at a level of from about 12% to about 20%.

* * * * *